(12) United States Patent
Vaage

(10) Patent No.: US 7,466,630 B2
(45) Date of Patent: Dec. 16, 2008

(54) METHOD FOR MONITORING PERFORMANCE OF MARINE SEISMIC AIR GUN ARRAYS

(75) Inventor: Svein Torleif Vaage, Oslo (NO)

(73) Assignee: PGS Geophysical AS, Lysaker (NO)

( * ) Notice: Subject to any disclaimer, the term of this patent is extended or adjusted under 35 U.S.C. 154(b) by 73 days.

(21) Appl. No.: 11/433,739

(22) Filed: May 12, 2006

(65) Prior Publication Data
US 2007/0263489 A1 Nov. 15, 2007

(51) Int. Cl.
*G01V 1/137* (2006.01)
(52) U.S. Cl. ........................................ 367/144
(58) Field of Classification Search ................ 367/114, 367/144; 181/107, 120, 111, 118
See application file for complete search history.

(56) References Cited

U.S. PATENT DOCUMENTS

| | | | |
|---|---|---|---|
| 4,034,827 A | 7/1977 | Leerskov et al. | |
| 4,047,591 A | 9/1977 | Ward et al. | |
| 4,064,479 A | 12/1977 | Ruehle | |
| 4,210,222 A | 7/1980 | Chelminski et al. | |
| 4,240,518 A * | 12/1980 | Chelminski | 181/107 |
| 4,324,311 A * | 4/1982 | Farris | 181/120 |
| 4,382,486 A | 5/1983 | Ruehle | |
| 4,393,889 A * | 7/1983 | Binegar et al. | 137/72 |
| 4,880,533 A * | 11/1989 | Hondulas | 210/104 |
| 6,983,550 B1 * | 1/2006 | Lin | 34/96 |
| 2007/0263489 A1* | 11/2007 | Vaage | 367/144 |

FOREIGN PATENT DOCUMENTS

| | | |
|---|---|---|
| FR | 2762398 | 4/1997 |
| GB | 2394046 | 4/2004 |
| WO | WO 97/22892 | 6/1997 |

OTHER PUBLICATIONS

Mark Simms, United Kingdom Search Report, Sep. 6, 2007.

* cited by examiner

*Primary Examiner*—Dan Pihulic
(74) *Attorney, Agent, or Firm*—E. Eugene Thigpen; Richard A. Fagin

(57) ABSTRACT

A method for characterizing function of an air gun includes measuring, with respect to time, a parameter related to pressure in a charge chamber portion of the air gun. The measurements with respect to time are used to characterize the function of the air gun.

15 Claims, 4 Drawing Sheets

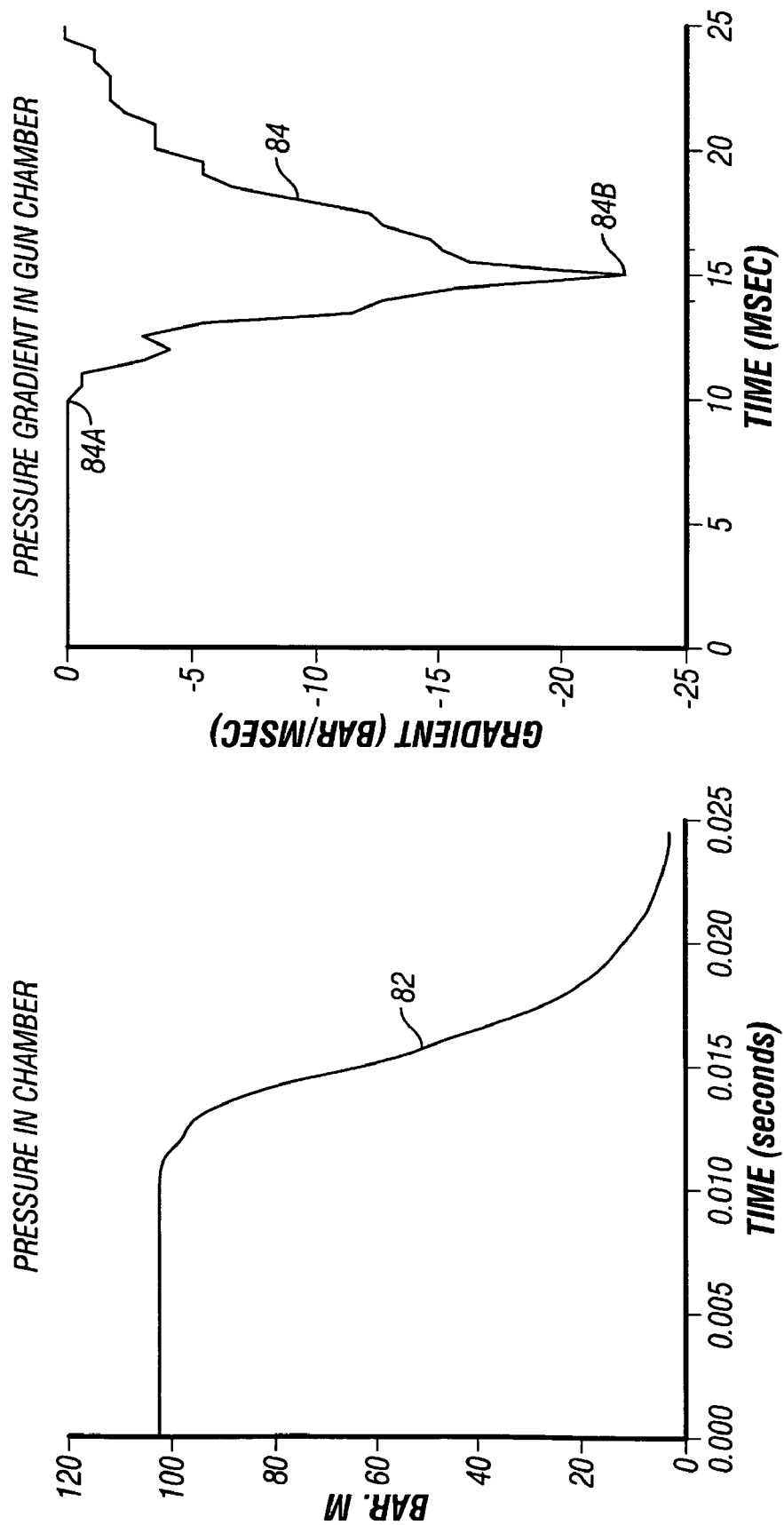

METHOD FOR MONITORING PERFORMANCE OF MARINE SEISMIC AIR GUN ARRAYS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic air guns used in marine seismic surveying. More particularly, the invention relates to systems for monitoring certain operating parameters for such air guns to verify performance and to diagnose operating faults.

2. Background Art

In marine seismic surveys, a seismic energy source is used to generate seismic energy in the form of acoustic pulses or waves in a body of water such a lake or the ocean. The seismic energy travels downward in the water, through the water bottom, and through the Earth formations underlying the water bottom. Part of the energy passing through the Earth formations underlying the water bottom is reflected upward therefrom at acoustic impedance boundaries in the Earth formations. The upward traveling energy is detected by sensors such as hydrophones towed in one or more streamer cables disposed near the water surface, or by sensors disposed in cables along the water bottom. The sensors convert the detected energy to electrical or optical signals. The electrical or optical signals are then conditioned and interpreted to provide information both as to the composition and the structure of the various subsurface Earth formations. Such information is used particularly to determine the possibility that such Earth formations may contain mineral deposits such as hydrocarbons.

Several different types of seismic energy sources have been used in the past to produce seismic energy in a form required in marine seismic surveys. For example, explosives have been used as a marine seismic energy source, but explosives are dangerous and are considered ecologically unacceptable for such purposes. Another type of marine seismic energy source, called a gas gun, includes detonating combustible gases in a chamber and then expelling the resultant gas charge into the water to produce the seismic energy. Certain risks are associated with the use of such gas guns, and as such gas guns are not widely used.

The most frequently used marine seismic energy source at present is known as an "air gun." In an air gun, a charge of compressed air or inert gas under high pressure, on the order of. 2000-6000 pounds per square inch (130 to 400 bar), is supplied to a chamber within the gun. When the air gun is actuated or "fired", a valve rapidly opens to discharge the pressurized air or gas from the chamber into the water. The valve then closes and the chamber is repressurized with air or gas from a source such as a compressor. Such firing can be repeated as often as desired and within the capacity of the source to repressurize the chamber. The air or gas discharges in a bubble or plurality of such bubbles in the water.

A single air gun produces a seismic pulse having acoustic energy content with respect to frequency (the source "signature") related to a complex pressure interaction between the air bubbles and the water that causes the bubbles to oscillate as they float toward the water surface. Such interaction can produce extraneous bursts of seismic energy following the initial energy burst. The amplitude and periodicity of these bubble-generated extraneous bursts depend on, among other factors, the depth of the gun in the water and the size of the pressurized air chamber in the gun. It is therefore known in the art to use an array of air guns having various different chamber sizes, and firing such guns contemporaneously or in a preselected timing sequence. Such firing of an array of air guns provides several advantages over firing a single air gun. First, the total amount of energy being imparted into the Earth's subsurface for each seismic "shot" is increased. In addition, the different chamber sizes for the various guns will produce different bubble responses, causing the bubble responses to tend to cancel each other. The directivity of the energy source toward the water bottom can be improved, because other than directly below the source array, some frequencies in the seismic energy will be attenuated by the spatial distribution of the guns in the array. Design considerations for air gun arrays to attain certain spectral and directivity characteristics are disclosed in U.S. Pat. No. 4,064,479 issued to Ruehle, and in U.S. Pat. No. 4,382,486 issued to Ruehle, for example.

In order to obtain the characteristics of an air gun array as described above, each air gun in the array must operate correctly. Any guns which leak air from their charge chambers so as to have lower than selected pressure therein at firing, any air guns which do not fire correctly so as to have the selected acoustic "signature" therefor, or air guns which "auto fire" or actuate other than at the selected time, or do not actuate at all, can all cause the acoustic energy content and directivity of the air gun array to be different than expected. Further, air leaks from one or more guns may introduce noise in the water that reduces the quality of the detected seismic signals.

It is known in the art to measure pressure in an "operating chamber" of a particular type of air gun in order to determine the precise moment in time at which any particular air gun fires. The operating chamber as known in the art is a part of the air gun which actuates a valve to release the high pressure air charge. Due to manufacturing tolerances and variations in the electromechanical response of the actuating control elements of typical air guns, there may be an indeterminate delay between transmission of an electrical actuation signal from a source control device and the actual discharge of compressed air or gas from the air gun. Pressure measurement within the firing mechanism of an air gun can be used to determine the actual firing moment. An arrangement for making such operating chamber pressure measurement and how to determine the firing instant are disclosed in U.S. Pat. No. 4,210,222 issued to Chelminski et al. Measuring pressure in the operating chamber of the air gun has proven useful in correcting for actuation time variations in air guns so configured. However, such pressure measurement has not found application beyond that described in the '222 patent.

What is needed is a system for monitoring performance of air guns to detect defective operation thereof, including but not limited to leaks, improper discharge of compressed gas and incorrect charge pressure.

SUMMARY OF THE INVENTION

One aspect of the invention is a method for characterizing function of an air gun. A method according to this aspect includes measuring, with respect to time, a parameter related to pressure in a charge chamber portion of the air gun. The measurements with respect to time are used to characterize the function of the air gun.

An air gun array according to another aspect of the invention includes a plurality of air guns. Each air gun has a charge chamber, a controllable valve configured to cause release of compressed gas stored in the charge chamber, a pressure transducer in pressure communication with an interior of the charge chamber. There is a charge line in pressure communication with the interior of the charge chamber and with a source of compressed gas. The charge chamber is pressurized after operation of the controllable valve. The array includes a control circuit in operative communication with each of the controllable valves and with each of the pressure transducers. The control circuit is configured to determine when pressure in each charge chamber varies from a predetermined value more than a selected threshold.

Other aspects and advantages of the invention will be apparent from the following description and the appended claims.

BRIEF DESCRIPTION OF THE DRAWINGS

FIG. 4 shows a graph of charge chamber pressure with respect to time as a gun is actuated.

FIG. 5 shows a graph of the time derivative of the pressure graph shown in FIG. 4.

DETAILED DESCRIPTION

A structure for an air gun, and an array of such air guns as may be used in some embodiments of the invention are described, for example, in U.S. Pat. No. 4,210,222issued to Chelminski et al., incorporated herein by reference. It should be understood, however, that any other structures for air guns gun known in the art in which a charge of compressed air or gas is quickly released into the water to generate a seismic impulse may be used in accordance with the invention. Therefore, the structure for the air guns described in the Chelminski et al. '222 patent, and as set forth in more detail below, is provided only to explain the principle of the invention and is not a limit on the scope of the present invention.

Figure 1:
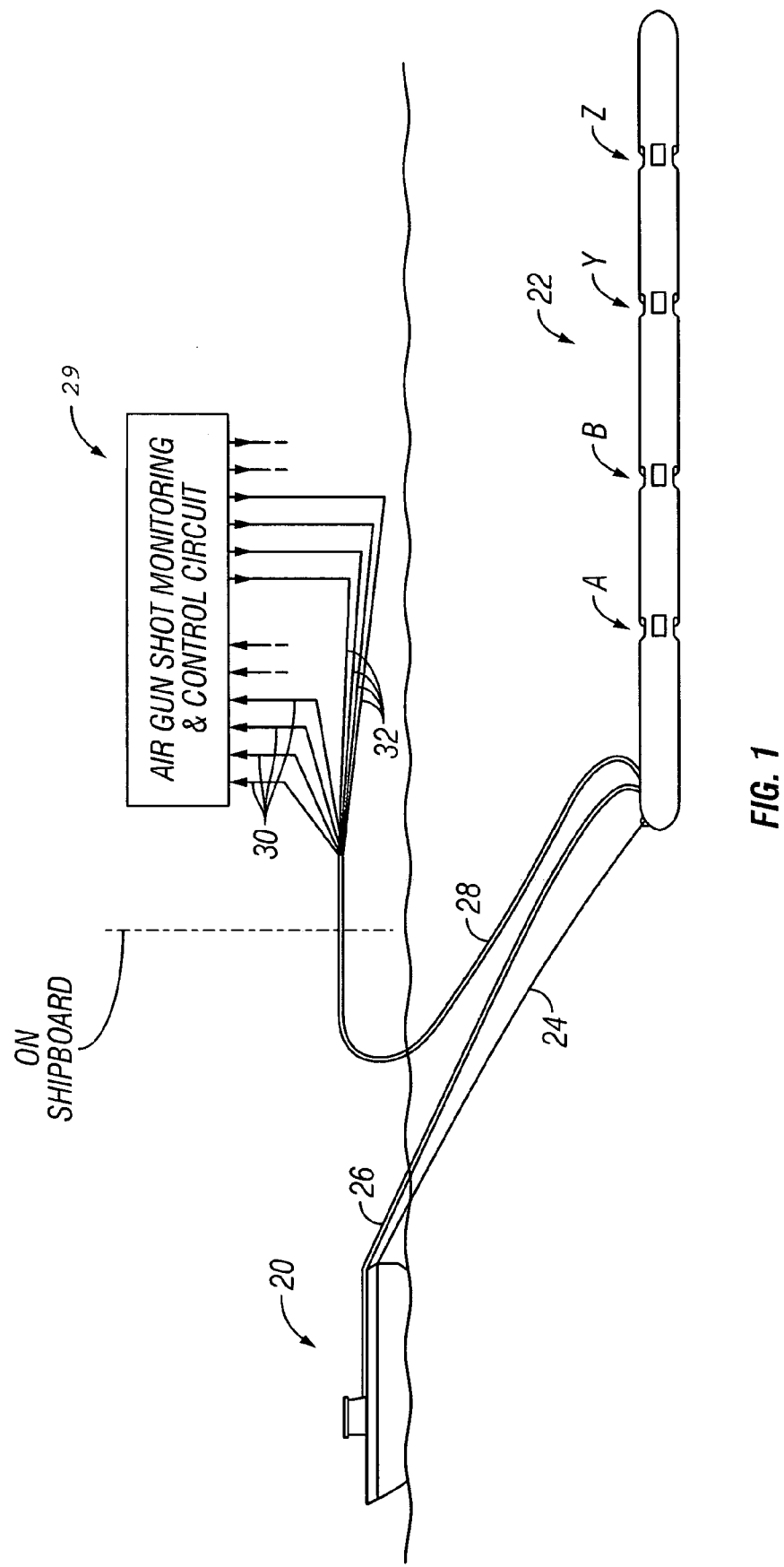
FIG. 1 illustrates a seismic survey vessel towing a multiple air gun marine seismic survey streamer. For illustrative purposes, the multiple air gun streamer is shown enlarged relative to the towing vessel, and a block illustration of the monitoring and control circuitry is shown enlarged at the upper right.

FIG. 1 shows a seismic survey vessel 20 towing a streamer 22 of air guns using a tow line 24 coupled to the vessel 20. The streamer 22 can be of a type disclosed in U.S. Pat. No. 4,038,630, for example, and which includes a plurality of air guns, four of which are designated by reference characters A, B, Y and Z in FIG. 1. Although a streamer 22 is shown in FIG. 1, it is to be understood that air guns can be towed by any other arrangement known in the art. High pressure air or other gas is supplied to the respective air guns through compressed gas supply lines, which may run in a bundle 26 from the vessel 20 to the streamer 22. The compressed gas supply lines may be coupled to a compressor (not shown) or similar device, usually located on the seismic survey vessel 20.

Each air gun A, B, Y, Z within the streamer 22 can be actuated ("fired") by an electrical trigger signal conducted from an air gun shot monitoring and control system 29, typically disposed on the seismic survey vessel 20. The electrical trigger signals may be conducted along individual electrical firing control lines 32 from the air gun shot monitoring and control system 29 to each air gun A, B, Y, Z.

In order to monitor the actual firing of each the several air guns A, B, Y, Z, as well as other operating characteristics of each air gun, a transducer signal, explained further below with reference to FIGS. 2 and 3, can be conducted from a transducer (80 in FIGS. 2 and 3) in each air gun along an individual electrical signal line 30 within the cable 28 to the air gun shot monitoring and control system 29. The transducer signals may be used, in some embodiments, to cause each of the air guns A, B, Y, Z to fire precisely in accordance with a preselected timing relationship, for example, synchronously or in a timed sequence. The shot monitoring and control system 29 may be configured to advance or delay particular ones of the trigger signals being conducted into the respective firing control lines 32 in order to cause the actual firing instant of the respective air guns A, B, Y, Z to be in accordance with the predetermined timing relationship. As will be further explained below, the transducer signals may also be used to characterize the functioning of each air gun.

Indication of a misfire (no actuation) of one or more of the air guns A, B, Y, Z after transmission thereto of the trigger pulse, indication of malfunction (auto fire) of one or more air guns, and the sensing of the shot instant for each air gun may be performed by any appropriate circuitry within the control system 29 connected to the sensor signal lines 30, for example, as set forth in U.S. Pat. Nos. 4,034,827 and 4,047,591. The circuitry described in the foregoing patents includes means to sense movement of a gas-releasing shuttle within each air gun by magnetic, electromagnetic or electrostatic field effects to establish the precise instant of firing of each individual air gun. The respective trigger pulses applied by the control system 29 to the control lines 32 to actuate the respective air guns A, B, Y, Z may be delayed or advanced as described in the foregoing patents. However, as will be explained further below with reference to FIGS. 2 and 3, in the present invention, the sensor signal applied to the sensor signal lines 30 corresponds to the pressure and/or pressure change with respect to time as measured inside a charge chamber portion of each air gun A, B, Y, Z.

Figure 3:
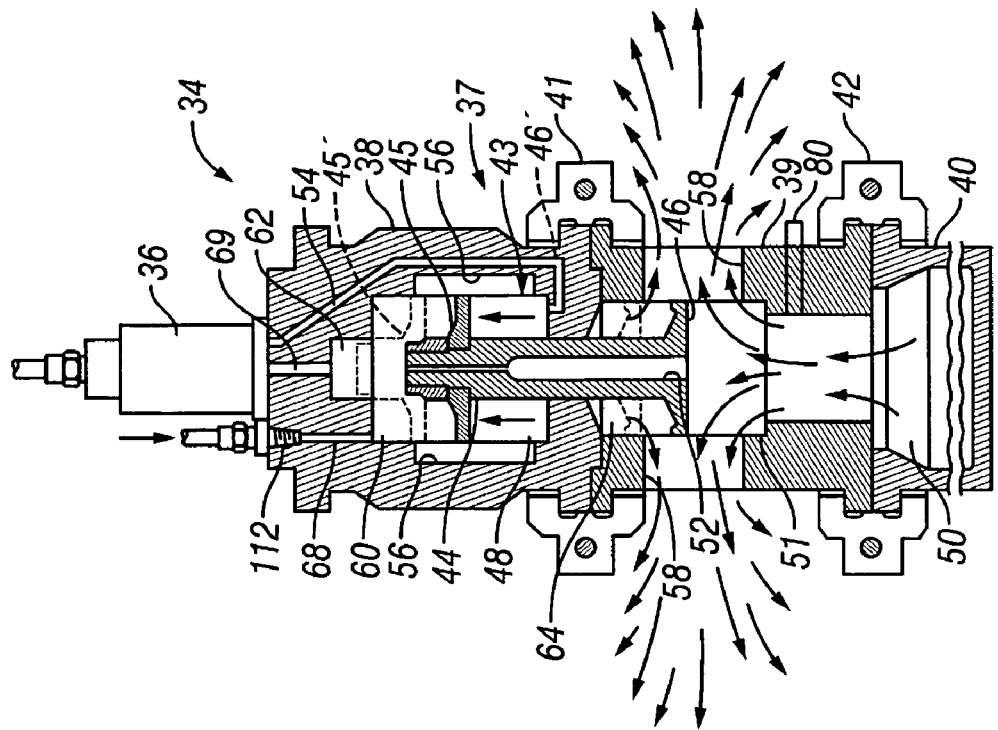
FIG. 3 is a side view similar to FIG. 2 but illustrating firing of the air gun.
Figure 2:
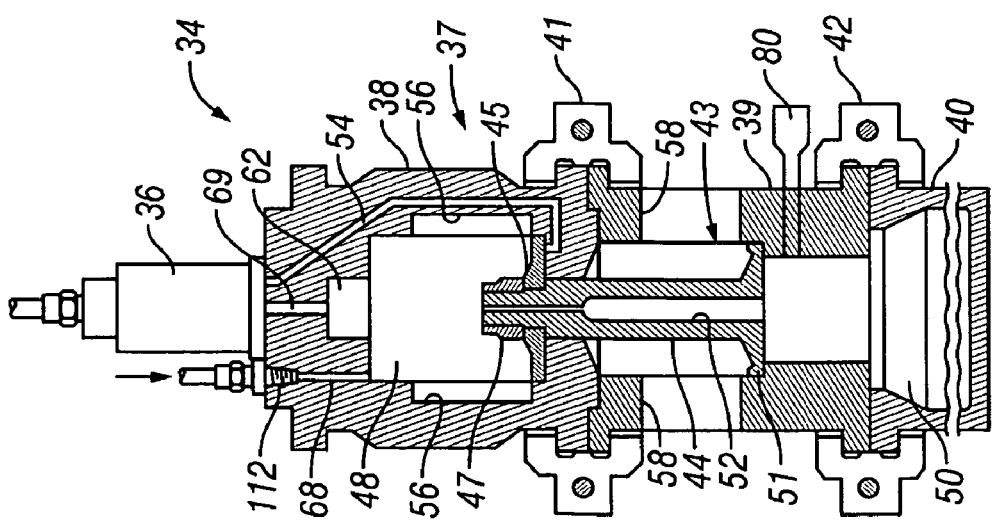
FIG. 2 is a side view of an air gun assembly with a solenoid valve at the top and with the air gun and its shuttle shown in section.

In the present embodiment, and with reference to FIGS. 2 and 3, each air gun in the streamer 22 may be of the type indicated at 34. The air gun 34 includes a housing 36 for a solenoid-actuated valve (not shown separately) and a housing assembly 37 in which a shuttle 43 is located.

The housing assembly 37 can include three sections, an operating chamber section 38, a discharge port (or intermediate) section 39, and a charge chamber section 40, sometimes referred to as a "firing chamber." The foregoing sections 38, 39, 40 can be assembled to form a single gun assembly by removable clamps 41 and 42. The use of a removable element for the charge chamber section 40 is particularly advantageous in that the volume of the pressurized gas storage, and thus the frequency and characteristics of the resulting seismic signal, may be readily changed by changing the charge chamber section 40 to one of a different volume.

The primary moving element of the air gun is the shuttle 43, which includes a central shaft 44, an upper piston element 45, and a lower piston element 46. The upper piston element 45 can be joined to the shaft 44 by a locknut 47. The upper piston element 45 can move axially within an operating chamber 48, and such upper piston element 45 controls actuation of the air gun 34. The lower piston element 46, when in its normally closed position rests on a seat 51 to seal a pressurized gas charge chamber 50.

In the charged condition, as shown in FIG. 2, pressurized gas, for example such as compressed air, is supplied through an inlet fitting 112 to a passage 68 in the housing 37 and enters the operating chamber 48. The pressurized gas presses down on the upper piston element 45 to hold the shuttle 43 in its lowermost position, which is the closed position. In the closed position, the charge chamber 50 is sealed by the lower piston element 46. The pressurized gas also passes from the operating chamber 48 through a bore 52 in the shuttle shaft 44, and into the charge chamber 50, thus pressurizing the charge chamber 50. The surface area of the shuttle 43 that is exposed to the pressurized gas in the charge chamber 50 is somewhat less than the surface area thereof exposed to pressurized gas within the operating chamber 48. Thus, the resultant forces act generally downward on the shuttle 43 and hold it in the closed position as shown in FIG. 2.

To actuate or fire the air gun 34, pressurized gas is applied through a trigger passage 54 to the bottom surface of the upper piston element 45. The pressurized gas is enabled to move into the trigger passage 54 by the trigger signal (FIG. 1) energizing a solenoid-operated valve (not shown separately) disposed inside a valve housing 36. The solenoid operated valve opens a fluid passage coupled between a passage 69 in the upper portion 62 of the operating chamber 48, and the trigger passage 54. The valve housing 36 can be secured onto the operating section 38 of the air gun 34 by bolts (not shown separately) or any other conventional manner. The force applied by the pressurized gas as it moves through the trigger passage 54 pushes upwardly on the upper piston element 45 and is sufficient to overcome the existing resultant downward force on the shuttle 43, thus causing the shuttle 43 to move rapidly upwardly. The seat 51 for the lower piston element 46 is sufficiently deep that the charge chamber 50 remains sealed even upon initial movement of the shuttle 43. Eventually, the upper piston element 45 reaches bypass passages 56 formed in the side of the operating chamber 48. At that point, pressurized gas in the operating chamber 48 is free to move from above the upper piston element 45 to below it, thereby tending to equalize the pressure-caused forces applied to each side of the upper piston element 45. The shuttle 43 can then quickly accelerate upwardly, driven by the force of the pressurized gas disposed in the charge chamber 50. When the shuttle 43 accelerates upwardly, the charge chamber 50 is then opened, and the pressurized gas pushes with explosive-like force outward through discharge ports 58 to create a seismic impulse.

In order to protect the upper piston element 45, the upper portion 60 of the operating chamber 48 may be configured to provide an air cushion. An air cushion is provided in the present embodiment because the bypass passages 56 do not extend to the top of the operating chamber 48. Thus, as the upper piston element 45 travels above the upper ends of the bypass passages 56, as shown by broken lines 45' in FIG. 3, gas becomes trapped in the upper portion 60 of the operating chamber 48 and within a reduced-diameter upper portion 62 thereof. Such trapped gas acts as a shock absorber and acts to bring the shuttle 43 to a halt and then to drive it back down toward its closed position. Similarly, water is trapped in a space 64 above the lower piston element 46 as shown at 46' to help stop the upward movement of the shuttle 43.

In the present embodiment, a transducer 80 may be affixed to the charge chamber section 40 such that it is in pressure communication with the interior of the charge chamber 50. The transducer measures a parameter related to pressure, which in some embodiments is the pressure itself. The transducer 80 may generate an electrical signal that corresponds to the pressure in the charge chamber 50 or to the time derivative of such pressure. The signal generated by the transducer 80 may be communicated to the shot monitoring and control system (29 in FIG. 1) over one of the signal lines (30 in FIG. 1). The signal may be used in the shot monitoring and control system (29 in FIG. 1) for a number of different purposes, which may be broadly described as characterizing the operation of the air gun. As examples, prior to firing the air gun 34, a drop in pressure inside the charge chamber 50, or a steady but low pressure therein, may be indicative of a leak in the air gun 34. Leaks from an air gun may create a source of noise in the water that would adversely affect the quality of seismic signals detected by seismic sensors (not shown in the figures), and indicate to the system operator that the affected air gun should be repaired or replaced. Low pressure may cause the seismic signal from such air gun not to cause the expected effect on the seismic signal output from an air gun array, thus compromising the quality of seismic data resulting therefrom.

At the time the air gun 34 is fired, it is expected that the pressure in the charge chamber 50 will decrease rapidly, and such will be explained in more detail below with reference to FIGS. 4 and 5. The change in pressure with respect to time during the firing event may be initially characterized with respect to water depth, water salinity and water temperature for a properly operating air gun. Typically, such time will be indexed with respect to the actuation time of the solenoid valve. During actual operation of an air gun or array of such air guns, any material deviation of the pressure, or the change in pressure, with respect to time from that initially characterized may be indicative of improper operation, such as caused by an obstructed discharge port 58, a sticking or faulty shuttle 43, or damage to either of the upper piston element 45 or the lower piston element 46. Absence of any change in pressure in the charge chamber 50 from the fully pressurized value, notwithstanding receipt of the trigger signal by the solenoid valve (not shown) may be indicative of a misfire (no actuation of the gun and subsequent discharge of air from the charge chamber 50). Similarly, pressure measurement indicative of discharge of the gun without corresponding receipt of a trigger signal may indicate an "auto firing" event (actuation of the air gun without a trigger signal).

FIG. 4 shows a graph of pressure in the charge chamber with respect to time, proximate the actuation time of an air gun configured substantially as explained with reference to FIGS. 2 and 3. The pressure is represented by curve 82, and shows a substantial decrease at about 11 to 12 milliseconds (i.e. the firing time), which time is approximately where the discharge port (58 in FIG. 2) is opened. During operation of an air gun or air gun array, the shot monitoring and control system (29 in FIG. 1) may record the pressure signal from the transducer in each air gun. Any change in the measured pressure at any instant in time from that as initially characterized that exceeds a selected threshold may be indicative of a fault in the air gun operation and in some embodiments may cause the shot monitoring and control system (29 in FIG. 1) to send a warning signal to the system operator, or may cause the affected air gun to cease operation. Such threshold may be applied at any instant in time or all times from the actuation time of the solenoid valve through the end of gun actuation (approximately 20 to 100 milliseconds depending on the volume of the charge chamber). Thus, at any time during the operation of the air gun, any material deviation of the charge pressure from that as originally characterized may be indicative of a malfunction of the air gun, such that the gun may be switched off or removed from service.

FIG. 5 shows a graph of the time derivative, at curve 84, of the pressure measurement shown in FIG. 4. The time derivative of the pressure measurement may be used for, among other purposes, determining the exact firing time of the air gun. Typically such time will be when the time derivative 84 deviate from zero, such being shown at 84A in FIG. 5. Relative firing times on a shot by shot basis can also be very accurately measured from when the time derivative in 84 reaches a minimum, such being shown at 84B in FIG. 5. Non-zero derivative prior to actuation of the solenoid operated valve may be indicative of a leak in the air gun. More importantly, any substantial change in the time derivative for any particular air gun during gun operation may be indicative of a fault in the particular air gun, such that it may be switched off or removed from service.

Figure 6:
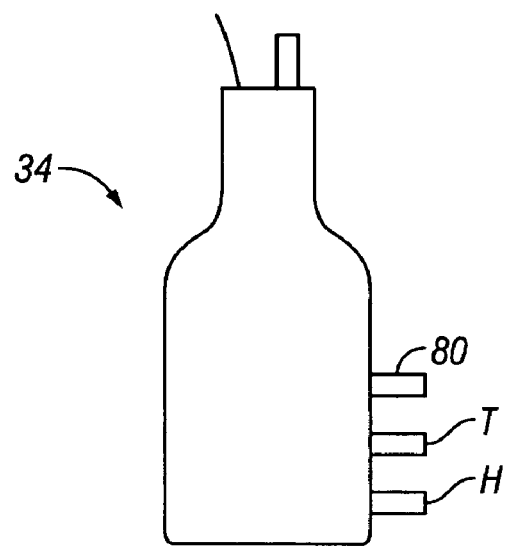
FIG. 6 shows an air gun including pressure, temperature and humidity sensors in communication with the charge chamber.

FIG. 6 shows another embodiment of an air gun 34 according to the invention that includes, in addition to the previously described pressure sensor 80, a temperature sensor T and a humidity sensor H. In one embodiment, the temperature sensor is in operative communication with the interior of the charge chamber (50 in FIG. 2) so that the temperature therein may be measured by the temperature sensor T. Use of seismic signals generated by the particular air gun, for example, may be delayed until the interior of the charge chamber reaches a selected operating temperature. Such temperature may be on the order of 90 to 100 degrees Celsius. The humidity sensor H is in operative communication with the interior of the charge chamber (50 in FIG. 2) and may be used in some embodiments to determine the presence of water inside the charge chamber. If water is determined to be present therein, the gun 34 may be operated rapidly and repeatedly until all the water is removed (expelled and/or evaporated) from within the charge chamber by such operation.

Figure 7:
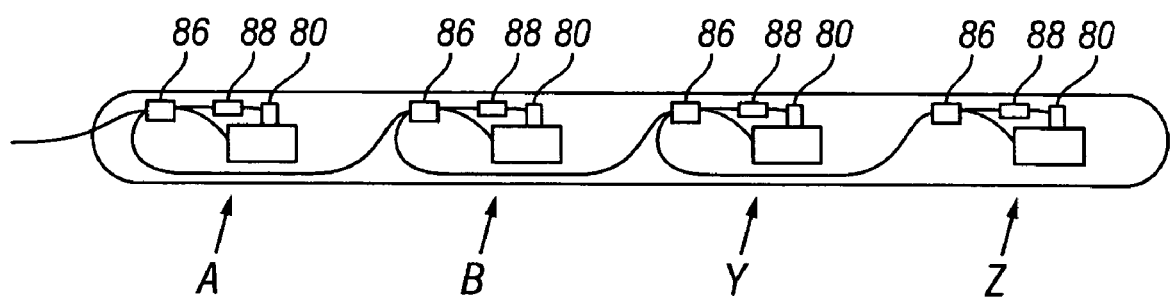
FIG. 7 shows an array of air guns including individual chamber pressure control apparatus for each gun in the array.

FIG. 7 shows an alternative embodiment of an air gun streamer 22, including four air guns according to various aspects of the invention, shown generally at A, B, Y and Z. Each air gun in FIG. 7 can include a pressure transducer 80 substantially as explained above with reference to FIGS. 2 and 3. In the embodiment shown in FIG. 7, each pressure transducer may operatively coupled to a solenoid valve 86 in the air line to the charging compressor, such that a selected pressure may be individually maintained in each air gun A, B, Y, Z. In one embodiment, each solenoid valve 86 may be individually controlled by a controller 88 suitably functionally coupled to both the valve 86 and the pressure transducer 80.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing a function of an air gun, comprising:
    measuring, with respect to time, a parameter related to pressure in a charge storage chamber portion of the air gun;
    using the parameter measured with respect to time to characterize the function of the air gun.

2. The method of claim 1 wherein the parameter comprises pressure.

3. The method of claim 1 wherein the parameter comprises a time derivative of pressure.

4. The method of claim 1 wherein the characterizing comprises determining a firing instant of the air gun.

5. The method of claim 1 wherein the characterizing comprises determining an existence of a leak in the air gun.

6. The method of claim 1 wherein the characterizing comprises determining an inadequate charge storage chamber pressure prior to firing the air gun.

7. The method of claim 1 wherein the characterizing comprises determining a failure of the air gun to fire upon receipt thereof of a firing trigger signal.

8. The method of claim 1 wherein the characterizing comprises determining a firing of the air gun absent receipt thereof of a firing trigger signal.

9. The method of claim 1 further comprising measuring temperature in the charge storage chamber, and delaying use of seismic signals generated by the air gun until the measured temperature reaches a selected value.

10. The method of claim 1 further comprising measuring humidity in the charge storage chamber, and determining a presence of water from the humidity measurement.

11. The method of claim 10 further comprising operating the air gun until the water is substantially removed from the charge storage chamber.

12. The method of claim 1 further comprising repeatedly actuating the air gun, repeatedly measuring the parameter related to pressure during each actuation and determining a fault in operation of the air gun when a change in the measured parameter exceeds a selected threshold for at least one actuation of the air gun.

13. The method of claim 1 further comprising measuring with respect to time a parameter related to pressure in a charge storage chamber of each of a plurality of air guns, and using the measured parameter to characterize the function of each air gun.

14. The method of claim 13 further comprising controlling a pressure in each charge storage chamber in response to the measured parameter.

15. The method of claim 14 wherein the pressure is controlled to be maintained at a selected value prior to actuation of each air gun.

\* \* \* \* \*